United States Patent
Grabau

(10) Patent No.: US 8,246,427 B2
(45) Date of Patent: Aug. 21, 2012

(54) DEVICE AND METHOD FOR SEPARATING SURFACE LAYERS IN PRODUCTS OF THE FOOD INDUSTRY

(75) Inventor: Thomas Grabau, Luebeck (DE)

(73) Assignee: Nordischer Maschinenbau Rud. Baader GmbH + Co. KG, Luebeck (DE)

( * ) Notice: Subject to any disclaimer, the term of this patent is extended or adjusted under 35 U.S.C. 154(b) by 0 days.

(21) Appl. No.: 12/867,331

(22) PCT Filed: Feb. 4, 2009

(86) PCT No.: PCT/EP2009/000999
§ 371 (c)(1),
(2), (4) Date: Aug. 12, 2010

(87) PCT Pub. No.: WO2009/100912
PCT Pub. Date: Aug. 20, 2009

(65) Prior Publication Data
US 2010/0313720 A1    Dec. 16, 2010
US 2012/0000331 A9    Jan. 5, 2012

(30) Foreign Application Priority Data
Feb. 15, 2008 (DE) .......................... 10 2008 009 922

(51) Int. Cl.
*A22C 25/17* (2006.01)
(52) U.S. Cl. ......................................... 452/125; 99/584
(58) Field of Classification Search .................. 452/127, 452/125; 99/584, 567, 589
See application file for complete search history.

(56) References Cited

U.S. PATENT DOCUMENTS

| | | | | |
|---|---|---|---|---|
| 2,645,812 | A * | 7/1953 | Jensen | 452/127 |
| 3,249,139 | A * | 5/1966 | Runnells, Jr. et al. | 452/127 |
| 5,591,076 | A * | 1/1997 | Evers et al. | 452/157 |
| 6,129,625 | A * | 10/2000 | Cate et al. | 452/127 |
| 7,081,048 | B2 * | 7/2006 | Bech | 452/161 |
| 2004/0029512 | A1 * | 2/2004 | Jurs et al. | 452/127 |

(Continued)

FOREIGN PATENT DOCUMENTS

DE    19834866 A1    2/2000
(Continued)

OTHER PUBLICATIONS

International Search Report From PCT/EP2009/000999 Dated Apr. 24, 2009 With English Translation.

(Continued)

*Primary Examiner* — Stephen Choi
(74) *Attorney, Agent, or Firm* — Venable LLP; Robert Kinberg; Ryan M. Flandro

(57) ABSTRACT

A method and apparatus to separate a surface layer of a product in the food industry. The apparatus includes a transport device to transport the product from an input region to an output region and a pressure device to press the product against the transport device. A separating device is arranged in the output region to separate the surface layer from the product. The separating device defines a separating gap between the separating device and the transport device. A substantially cylindrical, rotatably controllable deflecting device is arranged in the output region. The deflecting device has a shape varying in the axial direction and/or a circumferential direction. The transport device is guided around the deflecting device to create a variable process gap to separate the surface layer of the product from the product.

15 Claims, 3 Drawing Sheets

U.S. PATENT DOCUMENTS

2004/0069180 A1 * 4/2004 Theurer .................. 104/10

FOREIGN PATENT DOCUMENTS

| DE | 102005047752 B3 | 10/2006 |
| NL | 1007704 | 6/1999 |
| WO | WO-01/91567 | 12/2001 |
| WO | WO-02/062150 | 8/2002 |
| WO | WO-02/078453 | 10/2002 |

OTHER PUBLICATIONS

English-language translation of International Preliminary Report on Patentability, dated Jul. 5, 2010, issued in parent International Application No. PCT/EP2009/000999.

* cited by examiner

DEVICE AND METHOD FOR SEPARATING SURFACE LAYERS IN PRODUCTS OF THE FOOD INDUSTRY

CROSS-REFERENCE TO RELATED APPLICATIONS

This application is a National Stage Application of PCT/EP2009/000999, filed Feb. 4, 2009, which designates the United States and claims the priority of German patent application DE 10 2008 009922.8, filed on Feb. 15, 2008, the subject matter of which is incorporated herein by reference.

BACKGROUND

The invention concerns an apparatus for separating surface layers in products of the food industry, comprising a transport element for transporting the products from an input region to an output region, wherein the transport element is guided at least in the output region round a substantially cylindrical deflecting element, a pressure element for pressing the products against the transport element, and a separating element for separating the surface layer from the product, wherein the separating element is arranged in the output region of the transport element, forming a separating gap between the separating element and the transport element. Furthermore the invention concerns a method for removing surface layers in products of the food industry, comprising the steps of: transporting the product to be treated by means of a transport element from an input region to an output region, delivering the product to a separating gap which is formed between a separating element located in the output region and the transport element, pressing the product to be treated by means of a pressure element against the transport element during the separating operation, and separating a surface layer by means of the separating element arranged in the output region of the transport element.

Such apparatuses and methods are used in the food industry and in particular in the fish-processing industry. By the example of processing fish, this means e.g. that the skin and/or the fat layer underneath is separated from the fillet. Separation of the skin and/or fat layer from the fillet can take place in one separating cut or in several separating cuts one after the other. In this case the separating elements for separating the surface layer usually run rectilinearly. This means that between the separating element and the transport element, or the deflecting element which is located in the region of the separating element and serves so to speak as a cutting support, a separating gap which remains constant across the full width of the transport element is formed. As a result, the surface layer to be separated has the same thickness across the full width. In particular for fish processing, however, for purposes of improving yield it is necessary to produce a cutting depth which is variable across the width. For example, salmon has a thicker fat layer in the region of the backbone than in regions which are remote from the backbone. Also, the thickness and width of the fat layer varies in the longitudinal direction of the fillet.

It has proved difficult, however, to construct or control the separating element in such a way that a cutting depth which is variable across the width can be obtained. Efforts were therefore made to adapt the transport element or elements lying underneath it accordingly. European Patent document EP 1 365 655 B1 discloses for example an apparatus in which a conveyor belt serves as a supporting surface for the products. This conveyor belt is allocated an adjustable support with an adjustable profile transverse to the direction of transport of the products. The support is located below the conveyor belt and comprises elements that can be raised and lowered and which are arranged side by side transversely to the direction of transport to produce the profile which forms a process gap. However, this apparatus has the drawback that it needs high expenditure on control. Further, the structural design is very complex and therefore cost-intensive.

SUMMARY

It is therefore an object of the present invention to provide an apparatus which is simple and easy to handle and which ensures a variable process gap in addition to the separating gap. Furthermore it is the object of the invention to propose a corresponding method.

This object is achieved firstly by an apparatus having the features mentioned hereinbefore by the fact that the deflecting element arranged in the output region is designed to perform a rotational movement and can be controlled accordingly and has a (cross-sectional) shape which varies in the axial direction and/or circumferential direction to form a process gap. As a result, the possibility of a variable process gap is provided in a surprisingly simple and effective manner. To put it another way, the changing shape of the deflecting element on the side facing towards the separating element on the one hand and the possibility of control of the deflecting element on the other hand enables the process gap to be variable, so that product-specific separating operations can be performed.

In an embodiment of the invention the deflecting element may be at least sectionally of concave construction in the region of the surface region or peripheral surface. As a result the process gap can be made at least partially larger or deeper, so that e.g. in the region of the backbone more fat can be removed than in the edge regions of a fillet.

The concave construction of the peripheral surface of the deflecting element may vary in width and/or depth both in the axial direction and in the circumferential direction. The axial direction denotes the direction transverse to the direction of transport of the products. The circumferential direction describes the direction of rotation of the deflecting element. Thus different profiles or process gaps can be set both in the longitudinal direction of the products and in their transverse direction.

In a further embodiment, the deflecting element is controllable during the separating operation to vary the process gap. By rotating the deflecting element, the process gap can be varied selectively, this being from one product to the next or also during processing of one product.

Secondly the object is achieved by a method having the steps mentioned hereinbefore by the fact that the deflecting element is controlled to perform a rotational movement, so that a variable process gap is formed in addition to the separating gap. The resulting advantages have already been described in connection with the apparatus according to the invention. To avoid repetition, reference is made to the appropriate passages.

BRIEF DESCRIPTION OF THE DRAWINGS

Further embodiments are apparent from the subsidiary claims and the description. One embodiment as well as the principle of the method are described in more detail with the aid of the attached drawings. The drawings show:

DETAILED DESCRIPTION

The apparatus shown in the figures serves to separate a fat layer from fillets of the salmon species. Naturally the apparatus is also suitable and can be used for treating/processing other products and in particular for separating other surface layers such as e.g. skin layers or the like.

Figure 1:
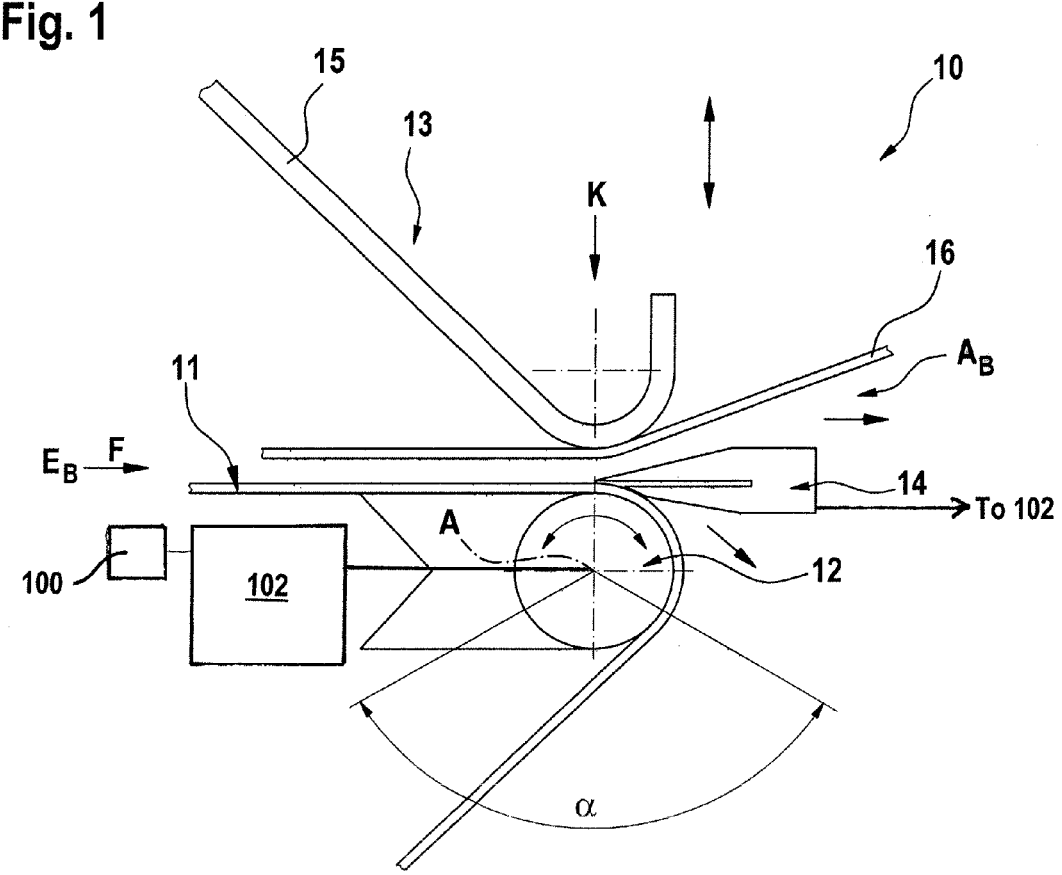
FIG. 1 is one embodiment of a schematic view of the apparatus according to the invention in a detail.

The apparatus 10 shown in substantial parts in FIG. 1 for separating skin layers and/or fat layers from fish fillets comprises a transport element 11. The transport element 11 may be constructed as an endlessly rotating and flexible conveyor belt or the like. Other embodiments of the transport element 11, e.g. as a suction belt, flexible conveyor chain or the like, are possible too. The transport element 11 is guided round several driving and/or deflecting elements, in particular also round a substantially cylindrical deflecting element 12. The products to be treated are transported in the direction of conveying F from an input region $E_B$ to an output region $A_B$. In the output region $A_B$ of the transport element 11 is arranged the cylindrical deflecting element 12.

Furthermore the apparatus 10 comprises a pressure element 13 for pressing the products against the transport element 11 as well as a separating element 14 for separating the surface layer from the product. The separating element 14 is also arranged in the output region $A_B$ of the transport element 11 and forms a separating gap between itself and the transport element 11. To adjust the size of the separating gap between the separating element 14 and the transport element 11, the separating element 14 is movable. The pressure element 13 may also be adjustable, for example, in the vertical direction to the plane of conveying, to vary the distance from the transport element 11. The pressure element 13 may consist of a pressure finger 15 and a guide belt 16 or the like. The pressure element 13, which can also have any other ordinary design, extends at least across the width of the product, but also across the full width of the transport element 11. In relation to the deflecting element 12, which is described in detail below, the pressure element 13 is located directly above the deflecting element 12. The pressure element 13 may be arranged in such a way that the pressure force K is directed perpendicularly to the axis A of the deflecting element 12. The pressure element 13 can also be constructed as a guide element and/or serve as a guide. In further embodiments, not shown, the pressure element 13 can also be assigned a guide element which is located in front of the pressure element 13 in the direction of conveying F and can have different constructions. In particular the guide element can be adapted to the contour of the products and be constructed or arranged in cascade fashion.

The deflecting element 12 arranged in the output region $A_B$ of the transport element 11 is at least partially movable. For this purpose the deflecting element 12 is designed to perform a rotational movement and can be controlled accordingly. In the embodiment shown, the cylindrical deflecting element 12 is rotatable about an axis A. Rotation about the axis A can take place e.g. within a defined angular range α limited by stops or the like, or circumferentially. Here the surface region or peripheral surface $M_F$ of the deflecting element 12 has a (cross-sectional) shape which varies in the axial direction and/or circumferential direction. Due to the special shape of the deflecting element 12 in the region of the peripheral surface $M_F$, in addition to the separating gap a process gap is formed or defined, which ensures individual and in particular also variable cutting control. To put it another way, the process gap can be varied both in width, that is, transversely to the direction of conveying F, and in depth, that is, vertically to the plane of conveying, separately from the separating gap or independently thereof.

Figure 2:
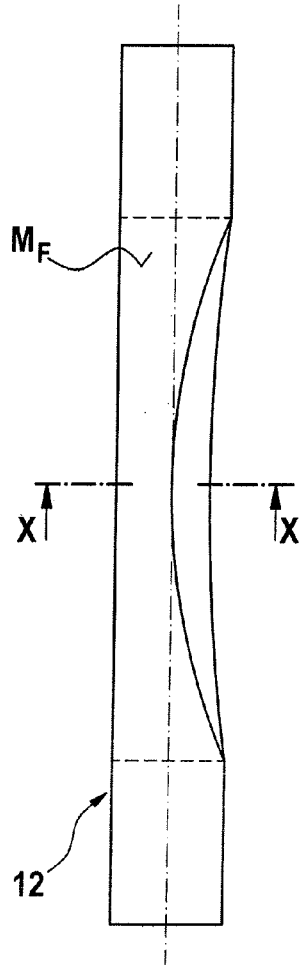
FIG. 2 is a top view of a substantially cylindrical deflecting element of the apparatus according to FIG. 1.

The deflecting element 12 may be at least sectionally of concave construction in the region of its peripheral surface $M_F$. However, the recess formed in the peripheral surface $M_F$ can assume other shapes. The concave construction of the peripheral surface $M_F$ of the deflecting element 12 varies in width and/or depth both in the axial direction and in the circumferential direction, as becomes clear in particular e.g. from FIGS. 2 to 4. The concave recess may extend over part of the width of the deflecting element 12 (see FIGS. 2 and 3). The recess can also extend across the full width. In the circumferential direction too, the recess is formed only partially (see FIG. 4). Forming the recess over the whole circumference is also possible, however. The deflecting element 12 is controllable in such a way that a different contour serves as a support for the separating element 14 optionally during a cut on one product or between cuts from one product to the next, due to rotation of the deflecting element 12, so that the cutting control varies. To put it another way, the process gap can be varied continuously or intermittently.

Figure 3:
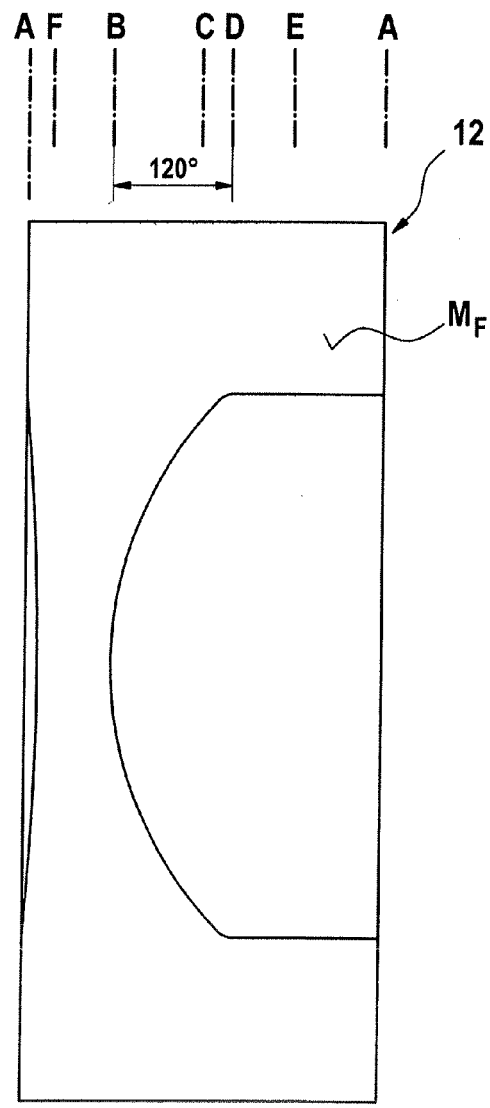
FIG. 3 is the deflecting element according to FIG. 2 with developed peripheral surface.
Figure 4:
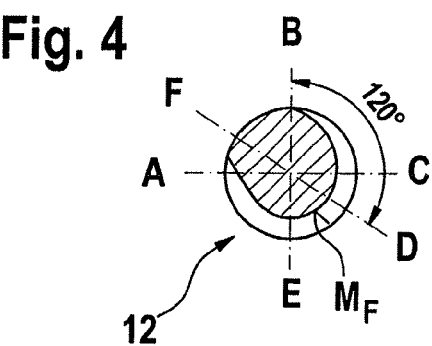
FIG. 4 is a sectional view of the deflecting element in section X-X according to FIG. 2.
Figure 5:
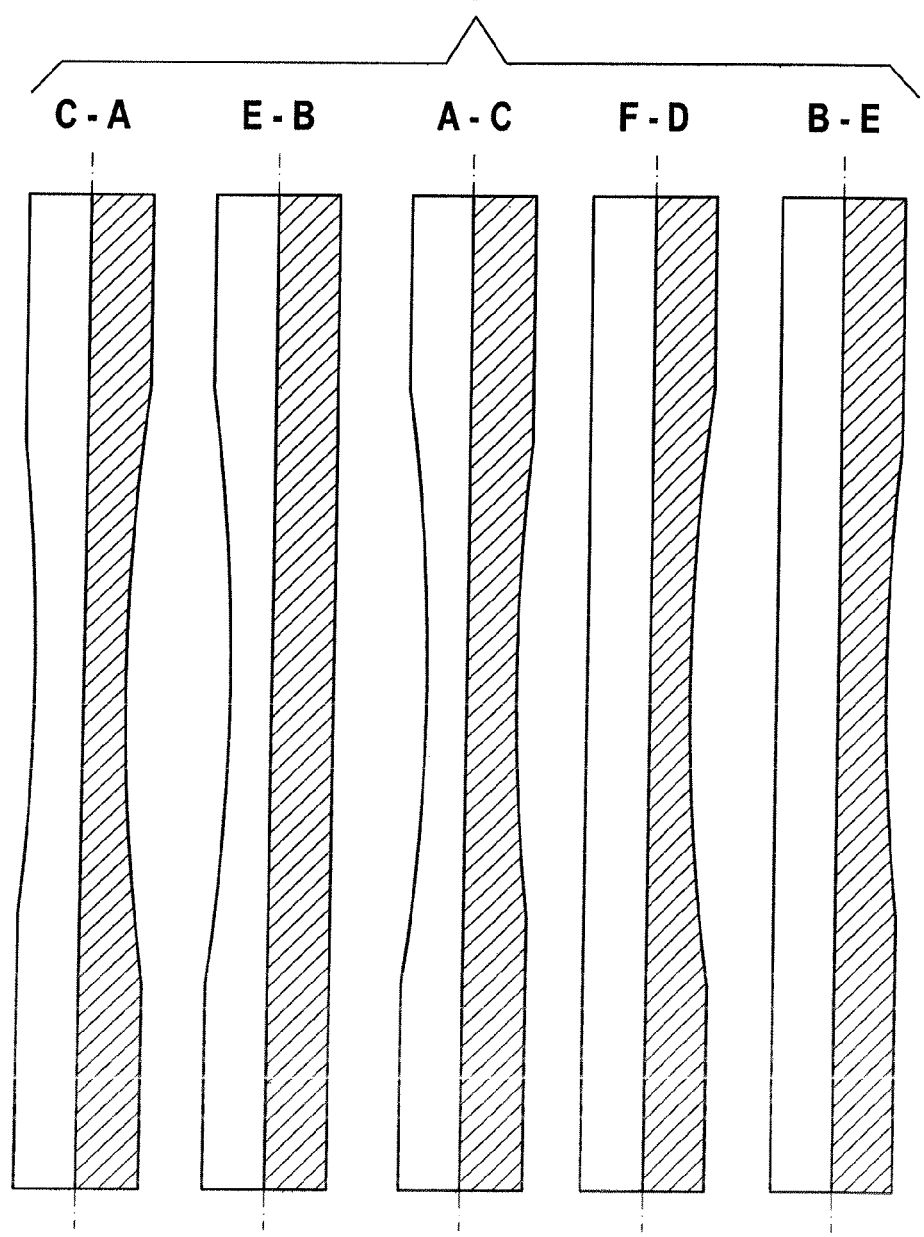
FIG. 5 is a half-section view of the deflecting element in the planes shown in FIG. 4.

With reference to FIGS. 2 to 5, the design of the deflecting element 12 becomes particularly clear. For instance, the section between planes B and D, which is shown in FIG. 3 as a developed peripheral surface $M_F$, corresponds to the circumferential section B-D of 120° in FIG. 4. In FIG. 5, sections C-A, E-B, A-C, F-D and B-E shown in FIG. 4 are shown for illustration.

The apparatus 10 can further be allocated, for control of the deflecting element 12, a detection device 100 for detecting geometrical data and/or image data of the products. To convert the detected data to a corresponding rotational movement of the deflecting element 12, the apparatus 10 comprises a control unit 102. The control unit 102 can be constructed and designed for control of the deflecting element 12 and/or separating element 14. The control unit 102 and the detecting device 100 are operatively connected to each other for this purpose.

For driving the transport element 11, a so-called squeeze drive is particularly suitable. But other ordinary drives can be used as well. The separating element 14 can be a band saw, an oscillating blade or any other suitable cutting and/or separating means. The pressure element 15 may be adapted to the contour of the respective product on the side facing towards the product. But flat or curved or other shaped constructions can be used as well. The deflecting element 12 can also have a profiled and pivotable deflecting edge or the like in embodiments not shown.

Below, the principle of the method is described in more detail with the aid of the figures: a first product is conveyed from the input region $E_B$ by means of the transport element 11 to the output region $A_B$. The separating element 14 is adjusted relative to the transport element 11, forming a separating gap. The product, lying on the transport element 11, runs under the pressure element 13 which presses the product with a defined force against the transport element 11. By the transport element 11, the product is conveyed against the blade or cutting edge of the stationary, rotating or oscillating separating element 14. During the separating process the pressure element 13 presses the product with a pressure force K onto the transport element 11, as a result of which the flexible transport element 11 and hence also the product fits closely against the contour of the deflecting element 12 arranged below one run of the transport element 11. By conveying the product further, the surface layer, that is, for example a skin and/or fat layer, is separated from the fillet. The separated surface layer is taken away obliquely downwards between the separating element 14 and the transport element 11, while the fillet is taken away obliquely upwards between the separating element 14 and the guide belt 16 of the pressure element 13.

The cutting control can be varied during the separating process by rotating the deflecting element 12 clockwise or anticlockwise, so that an altered contour is opposite the separating element 14 as a support. Control of the deflecting element 12 can also take place e.g. after a change of product, so that adaptation of the process gap is product-specific.

The invention claimed is:

1. An apparatus to separate a surface layer of a product in the food industry, comprising:
    a transport device to transport the product from an input region to an output region;
    a pressure device to press the product against the transport device;
    a separating device arranged in the output region to separate the surface layer from the product, the separating device defining a separating gap between the separating device and the transport device;
    a substantially cylindrical, rotatably controllable deflecting device arranged in the output region, the deflecting device having a shape varying in at least one of an axial direction and a circumferential direction, wherein the transport device is guided round the varying shape of the deflecting device to create a variable process gap to separate the surface layer of the product from the product;
    a detection device to detect at least one of geometrical data and image data of the product; and
    a control unit to control at least the deflecting device based on at least one of the detected geometrical data and image data of the product.

2. The apparatus according to claim 1, wherein the deflecting device is at least sectionally of a concave construction in a surface region of the deflecting device.

3. The apparatus according to claim 2, wherein the concave construction varies in width and depth in at least one of the axial direction and the circumferential direction.

4. The apparatus according to claim 1, wherein the control unit controls the separating device.

5. The apparatus according to claim 4, wherein the control unit is operatively coupled to the detection device.

6. The apparatus according to claim 1, wherein the deflecting device is controllable during a separating operation to vary the process gap.

7. The apparatus according to claim 1, wherein the separating gap is adjustable.

8. The apparatus according to claim 1, wherein the transport device comprises an endlessly rotating transport belt.

9. The apparatus according to claim 1, wherein the separating device comprises a band saw.

10. The apparatus according to claim 1, wherein the separating element comprises an oscillating blade.

11. The apparatus according to claim 1, wherein the pressure device is adapted to a contour of the product on a side facing the product.

12. The apparatus according to claim 1, wherein the product comprises a fish, and wherein the apparatus is constructed to separate a skin layer or fat layer from the fish.

13. A method to remove a surface layer of a product in the food industry, comprising:
    transporting the product by a transport device from an input region to an output region, wherein the transporting includes delivering the product to a separating gap formed between the transport device and a separating device in the output region;
    separating the surface layer from the product by a separating device arranged in the output region;
    pressing the product by a pressure device against the transport device during the separating step;
    detecting at least one of geometrical data and image data of the product; and
    controlling a substantially cylindrical, rotatable deflecting device arranged in the output region based on at least one of the previously detected geometrical data and image data of the product, wherein the deflecting device has a shape varying at least one of an axial direction and a circumferential direction, wherein the transport device is guided round the varying shape of the deflecting device to create a variable process gap in addition to the separating gap to separate the surface layer of the product from the product.

14. The method according to claim 13, wherein the controlling to vary the process gap is performed during the separating step.

15. The method according to claim 13, wherein the separating step includes varying the process gap in at least one of width and depth in an axial direction and in a circumferential direction.

* * * * *